US012075229B2

(12) United States Patent
Mehrbach

(10) Patent No.: US 12,075,229 B2
(45) Date of Patent: Aug. 27, 2024

(54) TRIANGULAR OR HEXAGONAL ANGLED MAGNET SHAPE FOR PLANAR MAGNETIC OR "ISODYNAMIC" DRIVERS

(71) Applicant: Zachary Arthur Mehrbach, Lyons, IL (US)

(72) Inventor: Zachary Arthur Mehrbach, Lyons, IL (US)

( * ) Notice: Subject to any disclaimer, the term of this patent is extended or adjusted under 35 U.S.C. 154(b) by 158 days.

(21) Appl. No.: 17/931,269

(22) Filed: Sep. 12, 2022

(65) Prior Publication Data

US 2024/0089664 A1 Mar. 14, 2024

(51) Int. Cl.
*H04R 9/06* (2006.01)
*H04R 9/02* (2006.01)

(52) U.S. Cl.
CPC ............... *H04R 9/06* (2013.01); *H04R 9/025* (2013.01)

(58) Field of Classification Search
CPC ................................. H04R 9/06; H04R 9/025
USPC .......................................................... 381/151
See application file for complete search history.

(56) References Cited

U.S. PATENT DOCUMENTS

| | | | |
|---|---|---|---|
| 4,191,863 A | 3/1980 | Matsuda et al. | |
| 7,088,837 B2 | 8/2006 | Von Hellermann et al. | |
| 8,064,631 B2 | 11/2011 | Hanada | |
| 8,520,887 B2 | 8/2013 | Simidian, II et al. | |
| 8,983,112 B2 | 3/2015 | Zhao | |
| 9,538,268 B2 | 1/2017 | Gladwin et al. | |
| 9,565,498 B2 | 2/2017 | Waale | |
| 9,894,442 B2 | 2/2018 | Salvatti | |
| 9,942,663 B1 | 4/2018 | Salvatti et al. | |
| 10,560,778 B2 | 2/2020 | Boyd | |
| 10,805,734 B2 | 10/2020 | Bian | |
| 11,006,922 B2 | 5/2021 | Boyd | |
| 11,212,580 B2 | 12/2021 | Barbis et al. | |
| 2008/0025552 A1 | 1/2008 | Dohi et al. | |
| 2018/0020292 A1 * | 1/2018 | Clark ..................... | H04R 13/00 |
| 2019/0364367 A1 | 11/2019 | Lorenz et al. | |
| 2021/0337314 A1 | 10/2021 | Zhang | |

* cited by examiner

*Primary Examiner* — Sean H Nguyen
(74) *Attorney, Agent, or Firm* — Dunlap Bennett & Ludwig, PLLC

(57) ABSTRACT

A planar magnetic transducer of a speaker driver unit includes one or more magnetic bodies wherein a proximate surface of the one or more magnetic bodies are facing rearward toward the transducer membrane, and wherein the proximate surface includes a tapered portion directed rearward so as to direct the frontward orientation of the soundwaves generated by the transducer membrane when electrical power is supplied to the electrical trace of the transducer membrane.

20 Claims, 5 Drawing Sheets

TRIANGULAR OR HEXAGONAL ANGLED MAGNET SHAPE FOR PLANAR MAGNETIC OR "ISODYNAMIC" DRIVERS

BACKGROUND OF THE INVENTION

The present invention relates to planar magnetic acoustic transducers and, more particularly, a triangular or hexagonal angled magnet shape for planar magnetic or "isodynamic" drivers.

Planar magnetic speakers have a diaphragm including a flexible membrane with an electrical trace (electrical circuit conductors) printed or mounted on one surface (the trace surface) thereof, wherein the membrane provides rectangular flat surfaces that radiate in a bipolar manner (i.e., emitting the same energy out the front and back). The current flowing through the electrical trace interacts with the magnetic field of carefully placed magnets on either/both sides (or on only one side for lighter driver units) of the diaphragm, causing the membrane to vibrate uniformly in (ideally) pistonic motion.

In sum, the membrane of the planar magnetic driver moves back and forth when electrical power is supplied to the pattern of electrical circuit/traces because the magnet(s) provide force that moves the membrane responsive to the positive and negative signals put through the traces; and by moving the membrane sound is produced.

Unfortunately, the stationary magnets stand in the way of the generated air waves getting through to the ear, obstructing the sound. The magnets are generally rectangular bar type magnets that are mounted to be in parallel relationship to a plane of the diaphragm. The pole positioning or arrangement of the magnets may vary between transducers, but the magnet surfaces are typically planar to the diaphragm. These magnets are usually shaped with a squared off edge to maximize magnetic force and efficiency, but in being this shape, also allow for more sound waves to get trapped and/or cause distortion, standing waves, and unwanted diffusion of sound that causes undesirable frequency response for the end user of the audio device.

In short, the shape of the magnets of planar magnetic drivers trap sound waves in the magnet driver chamber as the traces are positioned directly adjacent the magnet so that the direct path to the ear in a headphone or any audio system is much further and/or obstructed; as a result, current systems do not work well because the air waves have no direct escape since they always come upon a flat wall for sound to bounce off.

As can be seen, there is a need for a triangular or hexagonal angled magnet shape for planar magnetic or "isodynamic" drivers. Currently, alternate magnet shapes focus on the shape of the magnet on the ear facing side, while the present invention focuses on the magnet shape towards the membrane, this allows for a more complete and direct solution to the issue of sound waves escaping the planar magnetic driver chamber, rather than just trying to fix them after they have bounced around inside the driver chamber.

The present invention provides an angular surface for the magnetic component, wherein the angular surface is disposed and oriented in the magnet (driver) chamber is such a way that the sound waves escape less obstructed than the prior art, which forces sound waves around an object that is perpendicular to them. Therefore, the sound waves of the present invention have a more linear path to the end user via the tapered (e.g., triangular, trapezoidal, rounded, etc.) magnet shape on the membrane facing side of the driver.

In other words, the tapered magnet shape faces the driver, away from the ear of the listener. To elaborate, the only tapered side in the present invention is either side of magnets that faces the membrane.

Specifically, the present invention solves the issue by changing the shape of the magnets on either side of the planar driver membrane where the electrical traces are disposed. Instead of the shape being squared off, it is angled inward with either a slight trapezoidal shape, or a complete triangular shape. These shapes allow the sound waves to travel in a more direct pattern without the obstruction of the prior art's complete squared off edge, thereby allowing the end user to get fewer standing waves, distortion, or obstructed sound.

SUMMARY OF THE INVENTION

In one aspect of the present invention, a planar magnetic driver for use with an acoustic speaker, the driver includes the following: a membrane mounted within a frame, wherein the membrane is spaced inwardly of said frame; a metallic electrical trace provided on a trace surface of the membrane; a magnetic array carried within said frame so as to be in spaced generally opposing relationship to said electrical trace; and the magnetic array comprising a plurality of spaced apart magnetizable material, wherein a proximate surface of each magnetizable material obliquely tapers away relative to a plane of the membrane, whereby when electrical power is supplied to said electrical trace said membrane is caused to vibrate a-symmetrical by magnetic fields associated with the magnetic array.

In another aspect of the present invention, the planar magnetic driver further includes wherein the proximate surface is directed toward the trace surface, wherein the proximate surface defines a tapered portion, wherein the tapered portion terminates prior to a distal surface of each magnetizable material, wherein the tapered portion directs the orientation of soundwaves generated by the transducer membrane, wherein the proximate surface is disposed frontward of transducer membrane; further including a baffle frontward of the distal surface, wherein the proximate surface may be a vertex of an acute pyramid, a face of a hexagonal polyhedron, a face of a polyhedron, or a curved face of the magnetizable material, whereby when electrical power is supplied to said electrical trace said membrane is caused to vibrate a-symmetrical by magnetic fields associated with said magnetic array.

In yet another aspect of the present invention, a method of selectively altering the sonic characteristics of a planar magnetic driver includes shaping a magnetic body within a chamber of the planar magnetic driver so that a surface of the magnetic body facing a transducer member of the driver chamber provides a tapered portion.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a planar magnetic transducer of a speaker driver unit includes one or more magnetic bodies wherein a proximate surface of the one or more magnetic bodies are facing rearward toward the transducer membrane, and wherein the proximate surface includes a tapered portion directed rearward so as to direct the orientation of the soundwaves generated by the transducer membrane when electrical power is supplied to the electrical trace of the transducer membrane.

Referring now to FIGS. 1 through 12, the present invention may include a planar magnetic transducer for use with an acoustic speaker, wherein said transducer includes a transducer membrane 12 mounted between magnetic arrays 18 and 16. Note, in some embodiments, even though they are not explicitly shown, there may be only one magnetic array adjacent the transducer membrane 12, such as for smaller sized driver units, It should be noted that the magnetic arrays 18 and 16 may be formed as a unitary structure even though the Figures show them as two separable elements. The front magnetic arrays 18 may be disposed "earward" or frontward relative to the transducer membrane 12, meaning it is disposed between the transducer membrane 12 and the ear of the listener/wearer in the context of headphone speakers. The rear magnetic bodies 16 are rearward relative to the transducer membrane 12 and the location of the listener/wearer's ear.

The present invention contemplates a wide variety of tapered magnet arrays 18, 20, 22, 24, 26, 28, 28, 30, or 32 adjacent one side of the transducer membrane 12 (the tracer side, for instance). It should be understood that even though all of the tapered magnet arrays are shown in the frontward disposition, some embodiments of the present invention contemplate the tapered magnet arrays being disposed rearward. The magnet arrays 18, 20, 22, 24, 26, 28, 28, 30, or 32 may be made from magnetizable material.

Figure 1:
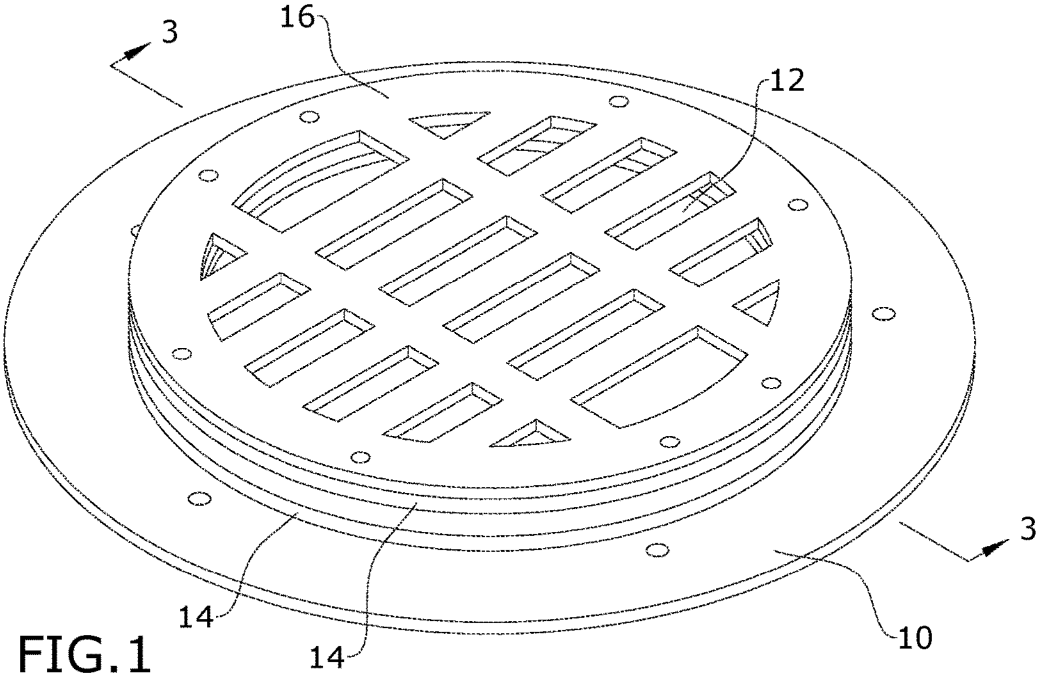
FIG. 1 is a top perspective view of an exemplary embodiment of the present invention.
Figure 2:
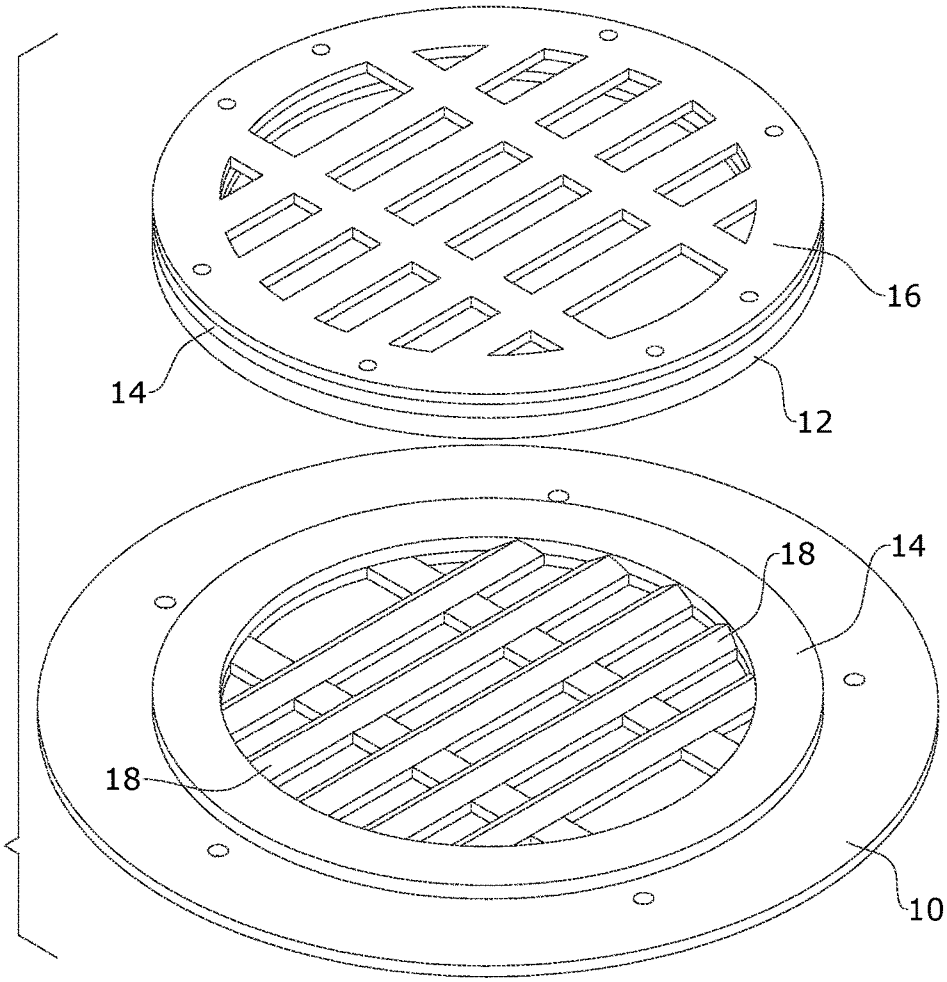
FIG. 2 is an exploded top perspective view of an exemplary embodiment of the present invention.
Figure 3:
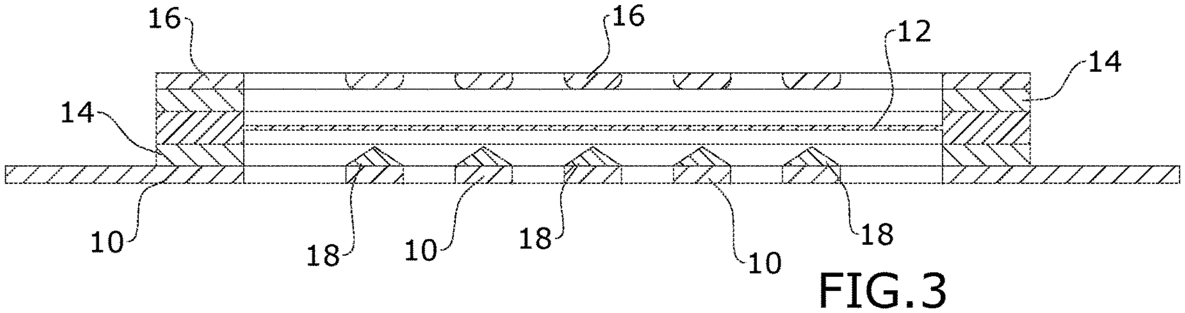
FIG. 3 is a section view of an exemplary embodiment of the present invention, taken along line 3-3 in FIG. 1.
Figure 4:
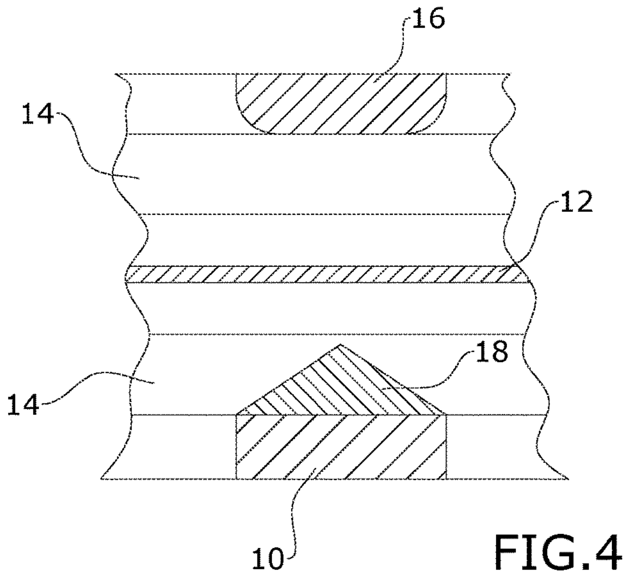
FIG. 4 is a detailed section view of FIG. 3.
Figure 5:
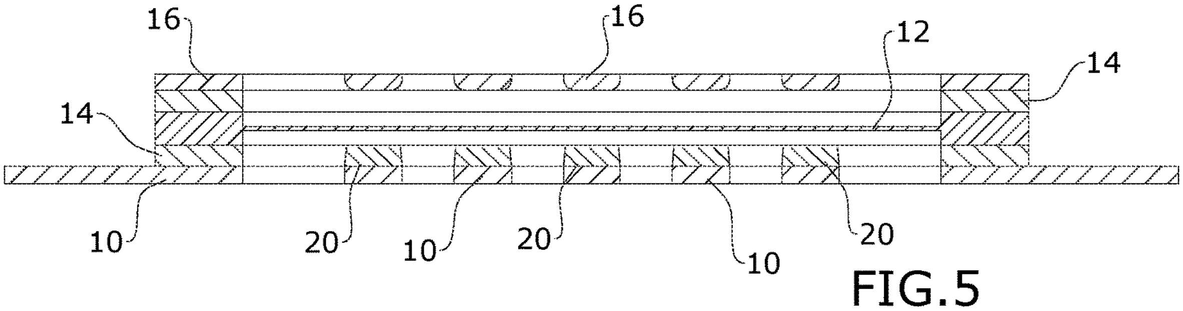
FIG. 5 is a section view of an exemplary embodiment of the present invention, based on an alternative to FIG. 3.
Figure 6:
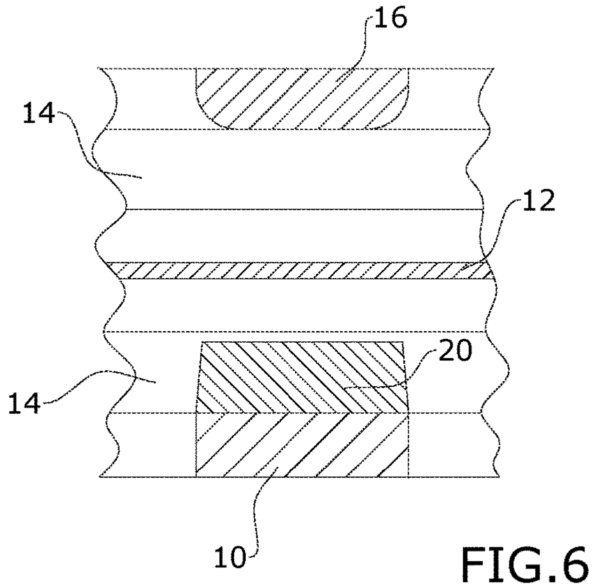
FIG. 6 is a detailed section view of FIG. 5.
Figure 7:
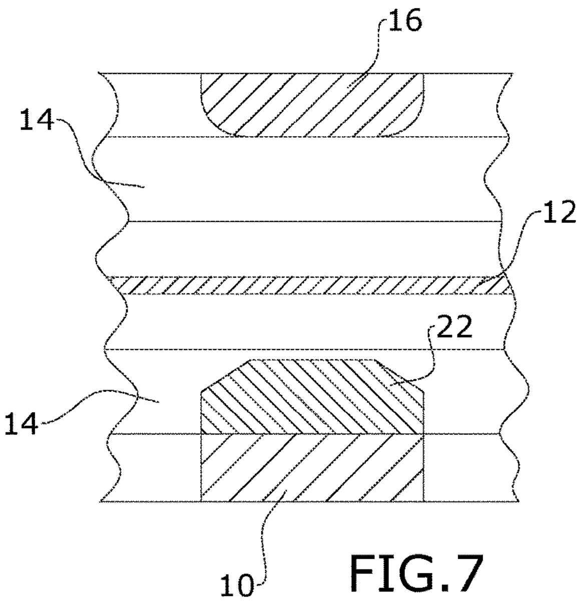
FIG. 7 is a detailed section view of an exemplary embodiment of the present, based on an alternative to FIG. 5.
Figure 8:
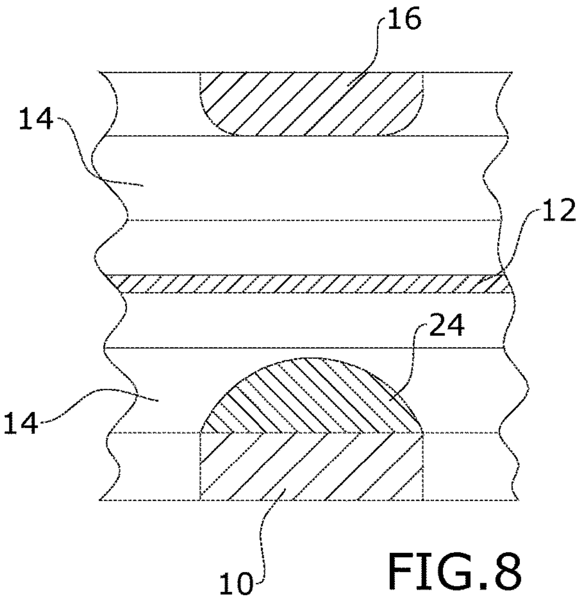
FIG. 8 is a detailed section view of an exemplary embodiment of the present, based on an alternative to FIG. 5.
Figure 9:
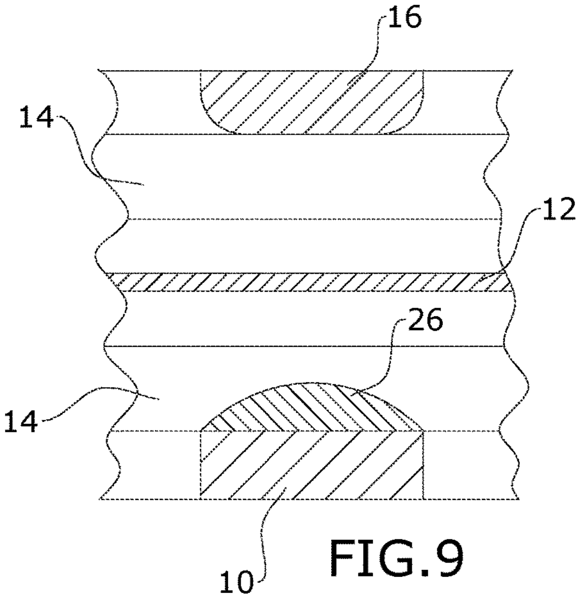
FIG. 9 is a detailed section view of an exemplary embodiment of the present, based on an alternative to FIG. 5.
Figure 10:
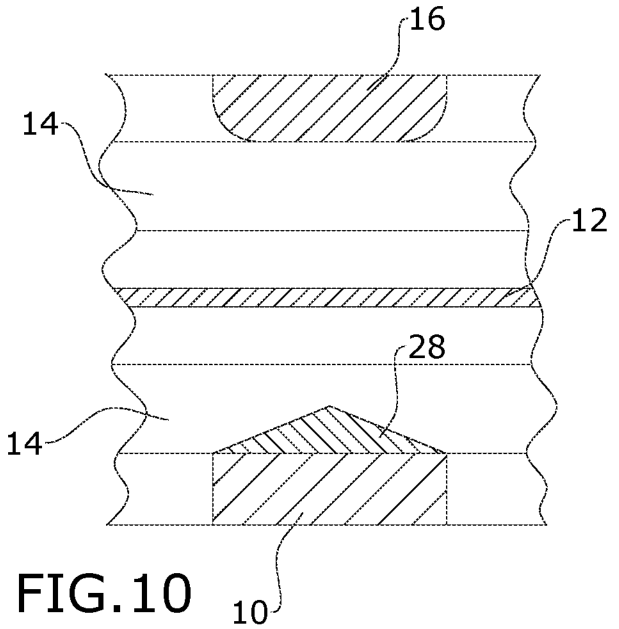
FIG. 10 is a detailed section view of an exemplary embodiment of the present, based on an alternative to FIG. 5.
Figure 11:
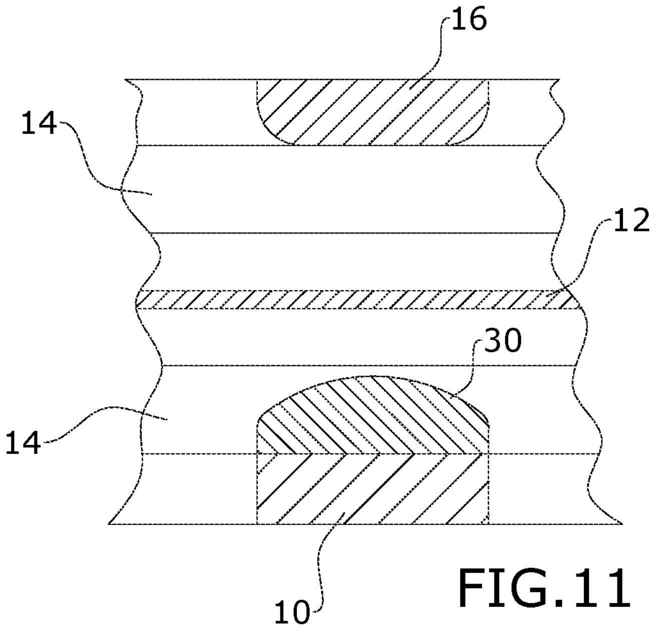
FIG. 11 is a detailed section view of an exemplary embodiment of the present, based on an alternative to FIG. 5.
Figure 12:
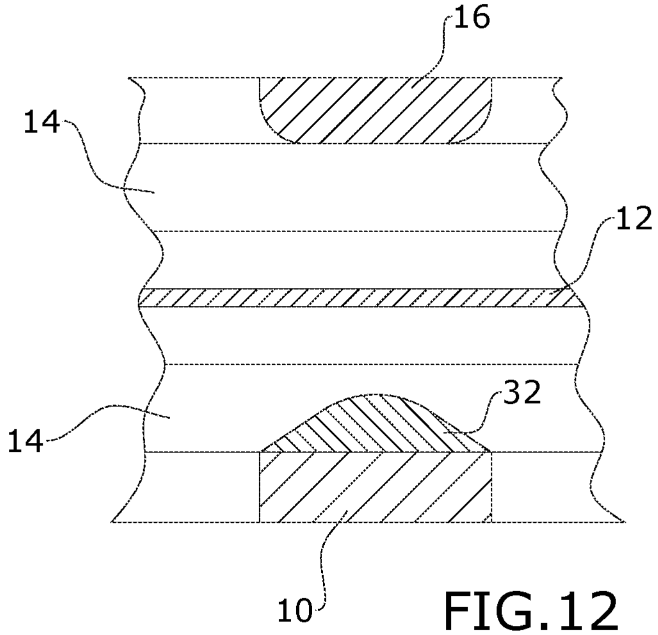
FIG. 12 is a detailed section view of an exemplary embodiment of the present, based on an alternative to FIG. 5.

As mentioned above, the magnet array 18, 20, 22, 24, 26, 28, 28, 30, or 32 may be spaced apart from one side of the transducer membrane 12, where on the other side of the magnet array is a diffuser or baffle 10. Each magnet array may be spaced apart from the transducer membrane 12 by way of a spacer 14 oriented substantially parallel to a plane of the transducer membrane 12. The spacer 14 may be annular or otherwise provide a framework, thereby possibly providing peripheral support to the magnet array, in certain embodiments, wherein the magnet array extends between opposing sides of the spacer 14 framework to be coplanar therewith. Again, on the opposing side of the transducer membrane 12 the spacer 14 may connected to its magnetic array in a different manner than the other side, as illustrated in FIG. 3. The transducer membrane 12 may be peripherally supported by a framework of each or both spacers 14, thereby defining a "driver chamber" between the spacers 14, which the transducer membrane 12 longitudinally bisects.

In one embodiment of the present invention, the magnet array 18 comprises pyramidic-shaped magnets. The pyramidic-shaped magnets may be defined, in part, by acute triangular cross-section, wherein a vertex (the "tapered portion") of the acute triangle is oriented approximately perpendicular to the transducer membrane 12. The triangular cross-sectional shape is dimensioned and adapted to transpose the sound waves more efficiently from the planar transducer membrane 12 due to the faces of the pyramid/triangle tapering away from the membrane 12 as opposed to being orthogonally disposed relative to the nearest or proximate surface of each magnetizable material. Accordingly, the magnetizable material may be shaped in various "tapering" surface or "tapered portions", as illustrated in FIGS. 6-12. The tapered portions may extend into the driver chamber, while the rear magnet array does not.

To be clear, the rectangular/cuboidal magnets on one of the sides (say the rearward side) of the transducer membrane 12 still work in the conventional manner, utilizing magnetic force, and positive and negative polarity to move the transducer membrane 12, and they may work with symmetrical or asymmetrical force depending on whether one, or both sides utilize a tapered magnet shape. The "tapering" magnetizable material of the same force cannot exert the same force of the rectangular magnet used on the non-user facing side, if the shape of the magnets is not congruent. This system can be customized via selective magnet tapering to optimize the acoustic properties for each specific headphone.

The tapered portions, in some embodies illustrated in the figures, of the frontward disposed magnet arrays are thus directed "rearward" toward the transducer membrane 12 and away from the ear of the listener/wearer which is identified by the presence of the diffuser/baffle 10. To be clear, the tapered portions of the magnetic arrays are spaced apart from the baffle/diffuser 10 by way of, at least, the remaining portions of the frontward magnet array.

This creates a chance for the designer of the system, to choose the angle of the tapering (e.g., trapezoid, triangular, etc.) shape, along with the specific magnet force of each magnet, to have as equal, or as asymmetrical a magnetic force as desired to test different magnetic system force. Different values will cause different amounts excursion via the membrane of the driver. Regardless of the different magnetic force chosen, the resulting airwaves will always exit the planar magnetic driver chamber more efficiently due to the less surface area obstructing the path between the membrane 12 and the wearer's ear. This will allow for a more desirable response to the end listener of the driver.

The present invention can be made by utilizing a typical north south magnet and making sure the edges where North and South meet come to a "tapered portion" (e.g., triangular, trapezoidal, rounded, etc.) shape instead of a square shape. This can be done by shaving an existing magnet or creating a mold for a new magnet.

The entire system of a planar magnetic driver is necessary including a baffle plate to hold the system, a membrane, planar magnetic conductors/traces (not shown), membrane material from 0.0001 to 50 micron thick and the magnets.

The only part of the system that can be changed is to alter the magnet strength, the magnet positioning, the membrane material and thickness, and the membrane size.

A method of using the present invention may include the following. An audio engineer would use the present invention by changing the magnet shape on either side of the driver or membrane 12, whether it be a full-size speaker or a headphone driver of small size. They would then change the value of the magnets to find whether a symmetrical or asymmetrical magnetic system would work best for the best sound quality. They could then change the membrane thickness to accommodate these changes in harmony with the best measurements.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A planar magnetic driver for use with an acoustic speaker, the driver comprising:

a membrane mounted within a frame, wherein the membrane is spaced inwardly of said frame;

a metallic electrical trace provided on a trace surface of the membrane;

a magnetic array supported by said frame so as to be in spaced generally opposing relationship to said electrical trace; and the magnetic array comprising a plurality of spaced apart magnetizable material, wherein a proximate surface of each magnetizable material obliquely tapers away relative to a plane of the membrane.

2. The planar magnetic driver of claim 1, wherein the proximate surface is a vertex of an acute pyramid.

3. The planar magnetic driver of claim 1, wherein the proximate surface is a face of a hexagonal polyhedron.

4. The planar magnetic driver of claim 1, wherein the proximate surface is face of a polyhedron.

5. The planar magnetic driver of claim 1, wherein the proximate surface is a curved face of the magnetizable material.

6. The planar magnetic driver of claim 1, wherein the proximate surface is directed toward the trace surface.

7. The planar magnetic driver of claim 6, wherein the proximate surface defines a tapered portion, wherein the tapered portion terminates prior to a distal surface of each magnetizable material.

8. The planar magnetic driver of claim 7, wherein the tapered portion directs the orientation of soundwaves generated by the transducer membrane.

9. The planar magnetic driver of claim 8, wherein the tapered portion is a face of a hexagonal polyhedron.

10. The planar magnetic driver of claim 8, wherein the tapered portion is a face of a polyhedron.

11. The planar magnetic driver of claim 8, wherein the proximate surface is disposed frontward of transducer membrane.

12. The planar magnetic driver of claim 9, further comprising a baffle frontward of the distal surface.

13. The planar magnetic driver of claim 12, wherein the proximate surface is a vertex of an acute pyramid.

14. The planar magnetic driver of claim 12, wherein the proximate surface is a face of a hexagonal polyhedron.

15. The planar magnetic driver of claim 12, wherein the proximate surface is face of a polyhedron.

16. The planar magnetic driver of claim 12, wherein the proximate surface is a curved face of the magnetizable material.

17. The planar magnetic driver of claim 12, wherein when electrical power is supplied to said electrical trace said membrane is caused to vibrate a-symmetrical by magnetic fields associated with said magnetic array.

18. A method of selectively altering the sonic characteristics of a planar magnetic driver, the method comprising:

shaping a magnetic body within a chamber of the planar magnetic driver so that a surface of the magnetic body facing a transducer member of the driver chamber provides a tapered portion.

19. The method of claim 18, wherein the magnetic body is frontward of the transducer member.

20. The method of claim 19, wherein the tapered portion is a vertex of an acute pyramid.

* * * * *